United States Patent [19]

Feikema et al.

[11] Patent Number: 4,532,998

[45] Date of Patent: Aug. 6, 1985

[54] LAWN EDGER DEVICE

[76] Inventors: Roger H. Feikema; Harry J. Bakker, both of 6050 Palmer Blvd., Sarasota, Fla. 33582

[21] Appl. No.: 537,072

[22] Filed: Sep. 29, 1983

[51] Int. Cl.³ .............................................. A01B 45/04
[52] U.S. Cl. ..................................................... 172/15
[58] Field of Search ....................... 172/13, 14, 15, 16, 172/42

[56] References Cited

U.S. PATENT DOCUMENTS

| | | | |
|---|---|---|---|
| 1,644,068 | 10/1927 | McBride | 172/15 |
| 2,478,813 | 8/1949 | Esleck | 172/15 X |
| 3,130,793 | 4/1964 | Allegretti | 172/15 |
| 3,338,314 | 8/1967 | Meltzer | 172/15 |
| 3,448,812 | 6/1969 | Peters | 172/15 |

FOREIGN PATENT DOCUMENTS 787119  6/1968  Canada ................................. 172/15

Primary Examiner—Richard J. Johnson
Attorney, Agent, or Firm—Frijouf, Rust & Pyle

[57] ABSTRACT

A lawn edger device is disclosed having a motor and a cutter blade supported by a platform and a handle mounted hand control for varying the depth of the cutter blade relative the ground. The platform includes a first and a second end, the first end being supported by a first set of ground engaging wheels. A first arm is pivotally connected to the second end of the platform. The distal end of the first arm rotatably supports a second set of the ground engaging wheels. A connecting arm is secured to the first arm and includes a toothed portion which cooperates with a locking plate rigidly connected to the platform. The toothed portion cooperates with the locking plate to variably adjust the longitudinal disposition of the connecting arm relative the locking plate. The hand control is pivotally connected to the connecting arm to release the toothed portion from the locking plate to permit movement of the connecting arm and thereby effect adjustment of the depth of the cutter blade relative the ground upon movement of the first arm.

19 Claims, 6 Drawing Figures

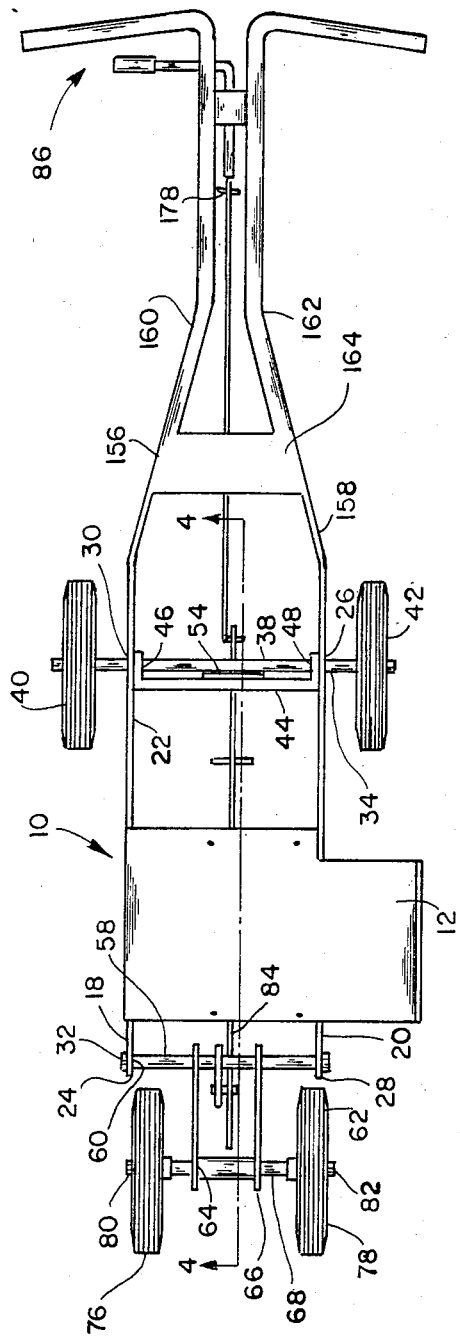

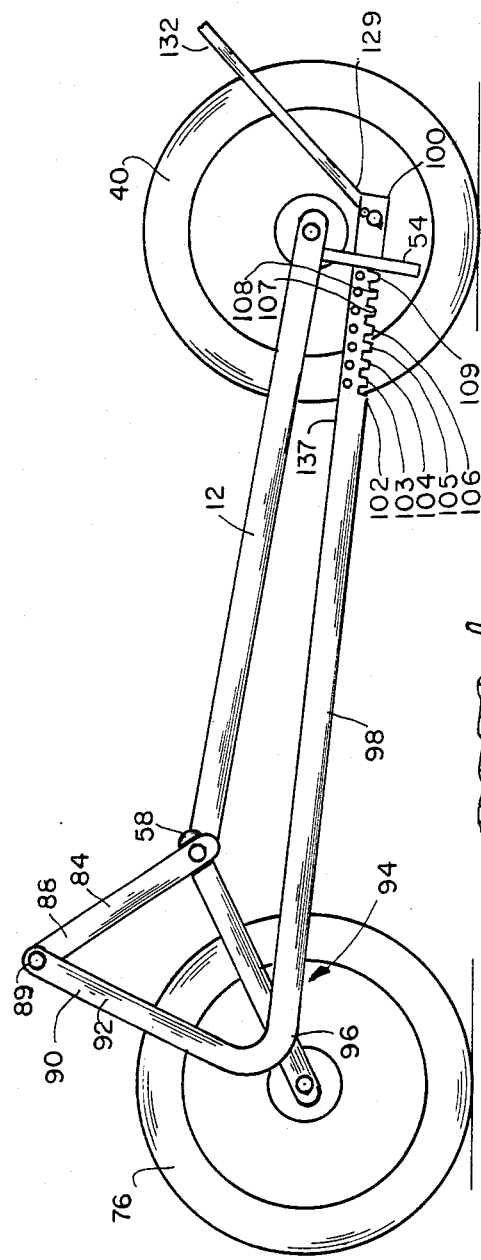
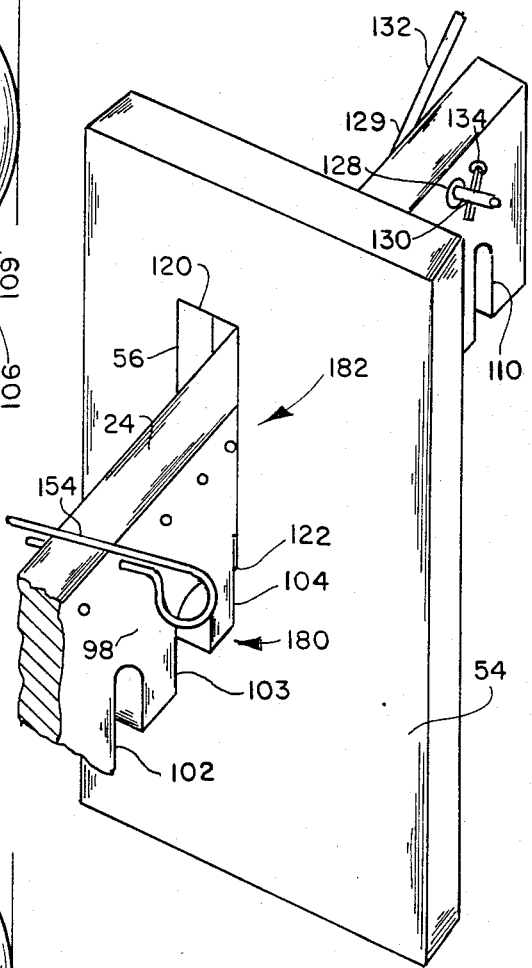
FIG. 5
FIG. 6

LAWN EDGER DEVICE

BACKGROUND OF THE INVENTION

1. Field of the Invention

This invention relates to a mobile device having a plurality of ground engaging wheels, a load supporting platform and a hand control for varying the angle defined by the platform and the ground. More specifically, this invention relates to a lawn edger device and the like.

2. Information Disclosure Statement

The average usage of a motorized lawn edger is eight hours per year. Because of the considerable stress imposed upon a lawn edger during operation of the same, the useful life of a motorized edger is forty hours. Therefore, on the average, a lawn edger must be repaced every five years and this imposes a relatively heavy financial burden on a person responsible for lawn maintenance.

In an effort to increase the ruggedness of construction of conventional lawn edgers, the handle has been fabricated as a relatively massive and reinforced structure in order to withstand the strain of manual variation of the depth of cut of the cutter blade. Usually, a system of arms and levers connect the cutter blade housing to the handle so that by manually pivoting a lever on the handle, the depth of cut can be controlled. In the prior art devices, if the handle were not of massive construction, there would exist a tendency for the arms and levers to buckle under the stress of vibration and when the cutter is cutting through relatively thick root systems. The heavy and reinforced structure of traditional edger handles increases the cost of manufacture of the same and the present invention provides a device for adjustably varying the depth of cut of the cutter blade of a lawn edger that avoids the need of such costly handles.

The adjustable depth hand control of the present invention overcomes the aforementioned inadequacies of the prior art devices by providing a simple and low cost pawl and ratchet mechanism that permits the variable adjustment of the cutter blade relative the ground or the like.

Although the prior art lawn edgers provide a reliable mechanism for adjusting either the depth of cut of the cutter blade relative the lawn and the angle at which the edge is cut, the prior art proposals have been relatively expensive to produce. It is the primary object of the present invention to provide a variably adjustable depth hand control for a lawn edger or the like that overcomes the aforementioned inadequacies of the prior art devices and provides an improvement which significantly contributes to the ease with which such lawn edgers can be made and therefore the low cost of production of the same.

Another object of the present invention is the provision of a lawn edger having a relatively lightweight handle and hand control for variably adjusting the depth of the cutter blade relative the ground.

Another object of the present invention is the provision of a lawn edger having a platform with first wheel means connected to the first end of the platform and with a first arm having second wheel means pivotably mounted to the second end of the platform with a connecting arm varying the rotatable position of the first arm relative to the platform to vary the height of the second end of the platform relative to the ground.

Another object of the present invention is the provision of a lawn edger having a connecting arm including a portion having a plurality of teeth for cooperating with a locking plate for variably fixing the disposition of the second end of the platfrom relative the ground.

Another object of the present invention is the provision of a lawn edger having a relatively lightweight handle which is rigidly connected to and extends angularly relative to the platform.

Another object of the invention is the provision of a lawn edger having a motor or an engine disposed on the platform whereby the motor or engine moves in unison with the adjustment of the cutter blade.

Another object of this invention is the provision of a lawn edger wherein the motor or engine is fixedly mounted relative to the cutter blade enabling the motor or engine to move in unison with the cutter blade upon adjustment of the depth of the cutter blade.

Another object of this invention is the provision of a lawn edger wherein the weight of the motor or engine is directly translated to effect downward pressure on the cutter blade.

Another object of this invention is the provision of a lawn edger wherein the connecting arm may be readily fabricated and assembled.

Another object of the present invention is the provision of a lawn edger which simplifies the interconnection between the motor or engine and the cutting blade.

Another object of the invention is the provision of a lawn edger wherein the depth of the cutting blade relative to the ground may be efficiently and positively controlled and wherein the stress of maintaining the cutting blade in a selected position is absorbed by a toothed portion of the connecting arm and a locking plate secured to the platform.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention within the scope of the invention. Accordingly, other objects and a fuller understanding of the invention may be had by referring to the summary of the invention and the detailed description describing the preferred embodiment in addition to the scope of the invention defined by the claims taken in conjunction with the accompanying drawings. This invention should not be construed as limited to lawn edgers but should include ground tillers, rotary trench cutters, road line markers, sports field marking machines and the like.

SUMMARY OF THE INVENTION

The lawn edger of the present invention is defined by the appended claims with a specific embodiment shown in the attached drawings. For the purpose of summarizing the invention, the invention relates to a lawn edger having a motor means and a cutter blade. The lawn edger includes a platform having a first and a second end with a first wheel means connected relative to the first end of the platform for supporting the first end of the platform at a substantially fixed distance from the ground. A first arm is pivotally connected proximate the second end of the platform. A second wheel means is rotatably mounted to the first arm. The cutter blade is disposed adjacent the second end of the platform. A locking plate means is rigidly connected to the platform. A connecting arm means is pivotally connected to the first arm. The connecting arm means has a toothed portion for cooperation with the locking plate means. Control means intermediate the connecting arm means and the handle mounted hand control controls the movement of the toothed portion relative the locking plate. The toothed portion of the connecting arm means cooperates with the locking plate means to movably adjust the longitudinal disposition of the toothed portion relative the plate. The distal end of the second portion is pivotally connected to the control means for varying the disposition of the platform relative the ground.

In a more specific embodiment of the invention, the handle is angularly disposed relative the longitudinal plane of the platform and the first end of the platform is rigidly secured to the handle. A first axle is disposed adjacent the first end of the platform for supporting the first rotatable wheel means. A second axle is rotatably disposed adjacent the second end of the platform and the first and a second arm are rigidly connected to and extend radially relative the longitudinal axis of the second axle which is parallel spaced relative to the first axle. A third axle is supported adjacent the distal end of the first arm such that the third axle is parallel spaced relative to the second axle, the third axle supporting a second rotatable wheel means. A third arm disposed parallel and spaced relative the first arm supports the third axle adjacent the distal end thereof such that the first and third arms are disposed between the second wheel means. The second arm and a first portion of the connecting arm are disposed on the same side of the longitudinal plane of the platform as the handle, and the toothed portion of the connecting arm is disposed on the opposite side of the longitudinal plane of the platform relative the handle. The connecting arm extends normal to the longitudinal axis of the second axle. A bracket extends from the handle and defines a hole through which the hand control extends such that when the hand control is pulled longitudinally relative the handle, the distal end of the toothed portion is pulled towards the bracket to release the toothed portion from engagement with the locking plate to permit pivoting of the first arm relative the platform.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 is a top plan view of the lawn edger of the present invention with the motor and cutter blade mechanism removed;

FIG. 2 is a side elevational view of the lawn edger shown in FIG. 1 but shows the motor mechanism attached to the platform;

FIG. 5 is a similar view to that of FIG. 4 but shows the toothed portion and locking plate adjusted such that the edger is raised relative the ground; and FIG. 6 is an enlarged fragmentary representation of the toothed portion of the connecting arm and the locking plate.

Similar reference characters refer to similar parts through the several views of the drawings.

DETAILED DESCRIPTION

Figure 3:
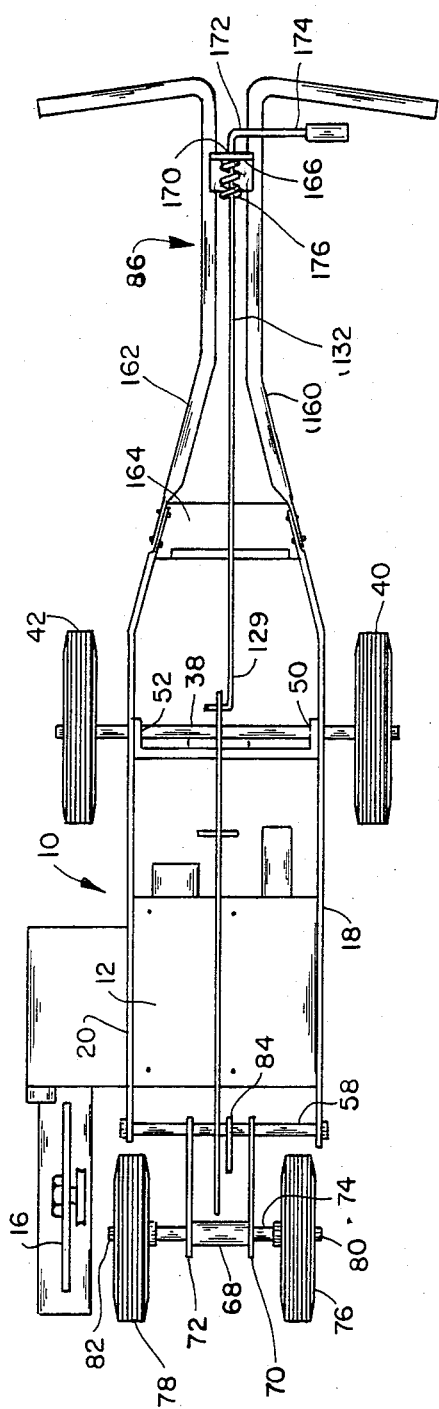
FIG. 3 is a bottom plan view of the lawn edger shown in FIG. 1 but shows the motor and cutter blade mechanism attached to the platform.

FIG. 1 is a top plan view of a lawn edger generally designated 10 with motive means and the cutter assembly removed. The edger 10 includes a platform 12 for supporting motive means which may either be a motor or an engine 14 and cutter blade 16 shown representatively in FIGS. 2 and 3. The platform 12 includes plural elongate members 18 and 20 which are spaced and parallel relative each other. The member 18 includes a first and a second end 22 and 24, respectively, and the second member 20 includes a first and a second end 26 and 28, respectively. The ends 22, 24, 26 and 28, respectively, define bores 30, 32, 34 and 36. A first axle 38 extends through bores 30 and 34 and rotatably supports plural first ground-engaging wheels 40 and 42, respectively. A U-shaped support bar 44 extends between the first ends 22 and 26 of the members 18 and 20, and the limbs 46 and 48 of the bar 44 define bores 50 and 52, respectively, such that the bores 50 and 52 are aligned with and disposed adjacent the bores 30 and 34 to permit the first axle 38 to extend therethrough. The limbs 46 and 48 are secured to the first and second members 18 and 20 by means (not shown) such as fasteners or welds. A plate 54 is rigidly secured to and depends from the bar 44 midway along the length of the bar 44. The plate 54 shown more particularly in FIG. 6 defines a slot 56 which cooperates with a toothed portion of a connecting arm to be described hereinafter.

As shown more particularly in FIGS. 1, 2, 3, 4 and 5, a second axle 58 extends through bores 32 and 36, respectively, such that the second axle 58 is rotatably supported by the second ends 24 and 28 of the members 18 and 20, respectively. Means shown as cotter pins 60 and 62 maintain the lateral disposition of the second axle 58 relative the members 18 and 20. A first and a third arm 64 and 66, respectively, extend radially from the longitudinal axis of the second axle 58. A tube 68 extends between the distal ends 70 and 72, respectively, of the arms 64 and 66. A third axle 74 extends through and is rotatably supported by the tube 68 such that the third axle 74 is parallel and spaced relative the first and second axles 38 and 58. Ground engaging wheels 76 and 78, respectively, of a second ground engaging wheel means are secured adjacent opposite ends 80 and 82 of the third axle 74 such that the first and third arms 64 and 66 are disposed between the wheels 76 and 78. A second arm 84 is rigidly connected to the second axle 58 between the first and fourth arms 64 and 66. The second arm 84 extends radially relative the longitudinal axis of the second axle 58 away from the longitudinal plane of the platform 12 on the same side of the longitudinal plane of the platform as a handle generally designated 86 to be described hereinafter. The distal end 88 of the second arm 84 is connected by a pivot 89 to a first end 90 of a first portion 92 of a connecting arm generally designated 94 as shown particularly in FIGS. 4 and 5. A second or toothed portion 98 of the connecting arm 94 is angularly disposed relative the first portion 92 by a bend 96. The first portion 92 depends from the pivot 89 at the distal end 88 of the second arm 84 towards the longitudinal plane of the platform 12. The second or toothed portion 98 of the connecting arm 94 is disposed on the opposite side of the longitudinal plane of the platform 12 relative the handle 86 and extends normal to the longitudinal axis of the second axle 58. The distal end 100 of the second portion 98 slidably extends through a slot 56 defined by the locking plate 54.

Figure 4:
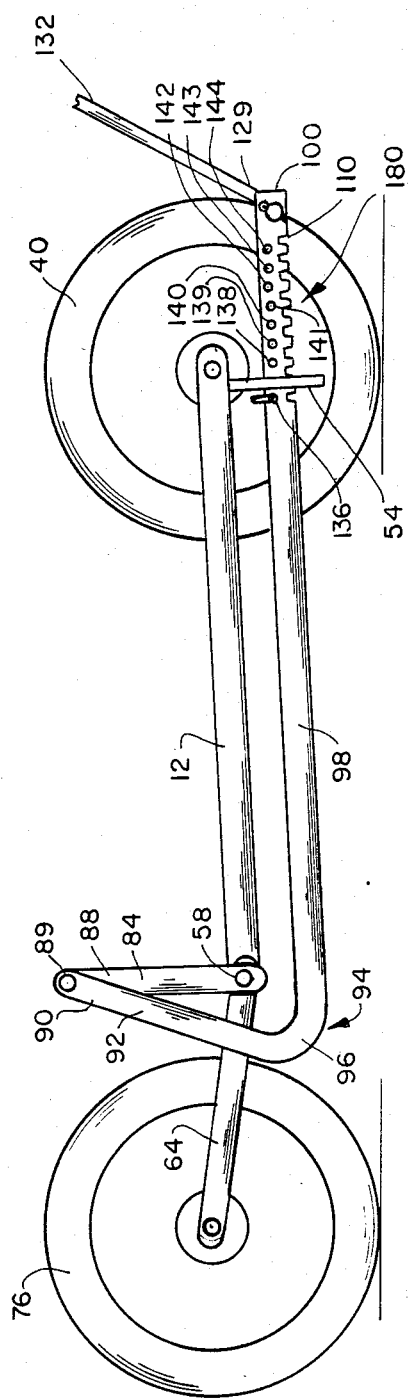
FIG. 4 is an enlarged sectional view taken on the line 4—4 of FIG. 1 and shows the edger lowered relative the ground.

As shown more particularly in FIGS. 4, 5 and 6, the second portion 98 of the connecting arm 94 defines a plurality of teeth 102, 103, 104, 105, 106, 107, 108, 109 and 110. The slot 56 includes a first and a second end 120 and 122, the first end 120 being disposed adjacent the bar 44 and the second end 122 being disposed remote from the bar 44. The second end 122 cooperates with the teeth 102-110 such that the longitudinal disposition of the second or toothed portion 98 may be variably adjusted. The slot 56 has a length between the ends 120 and 122 that is greater than the combined height of the second portion 98 and the height of one of the teeth thereby permitting the second portion to be moved from engagement with the second end 122 of the slot 56 towards the first end 120 of the slot 56. When the top surface 124 of the second portion 98 is disposed adjacent the first end 120 of the slot 56, the second portion 98 may be moved longitudinally through the slot 56. The distal end 100 of the second or toothed portion 98 defines an aperture 128 as best shown in FIG. 6. A distal end 129 of a control rod or control means 132 is connected by a pivot 130 received through the aperture 128 and a cotter pin 134 locks the pivot 130 in engagement with the aperture 128. A plurality of holes 136, 137, 138, 139, 140, 141, 142, 143 and 144 are defined by the second or toothed portion 98 and are disposed respectively adjacent the teeth 102-110. A locking pin 154 is removably located in any one of the holes 136-144 to limit the longitudinal disposition of the second portion 98 relative the plate 54.

The handle 86 which is angularly disposed and rigidly connected to the first ends 22 and 26 of the members 18 and 20, is of relatively lightweight construction when compared with the handles of prior art devices. The handle arms 156 and 158, respectively, of the handle 86 may be fabricated from steel bar of the same cross sectional dimensions as the members 18 and 20. Extensions 160 and 162 of the handle arms 156 and 158, respectively, may be fabricated from lightweight tubular material. A tie plate 164 reinforces and ties the the arm 158 and extension 160 to the arm 158 and extension 162. A depending bracket 166 is rigidly connected to and bridges between the extensions 160 and 162, respectively. The depending limb 168 of the bracket 166 defines a hole 170 which slidably receives the hand control 132. The end 172 of the hand control 132 adjacent the bracket 166 includes a lever 174 angularly disposed relative the hand control 132 such that the operator of the edger may with his fingers pull the hand control 132 axially relative the extensions 160 and 162. A compression spring 176 disposed coaxial with the hand control 132 reacts with a notch 178 formed on the hand control 132 and the depending limb 168 of the bracket 166 to urge the hand control 132 to slide axially through the hole 170 to lock one of the teeth 102-110 into engagement with the second end 122 of the slot 56. The hand control 132 and the teeth of the second portion 98 provide an adjustable position retaining plate mechanism which is generally designated 180. The plate 54 and slot 56 provide a locking plate mechanism generally designated 182.

In operation of the lawn edger 10, when the cutter blade 16 is to be lowered to provide a greater depth of cut relative the ground, the lever 174 is pulled axially relative the extensions 160 and 162. The hand control 132 moves axially relative the extensions 160 and 162. The control means, which is an extension of the hand control reacts with the distal end 100 of the second portion 98 to pull the toothed portion upwardly to disengage the second or toothed portion 98 from the end 122 of the locking plate mechanism 182. With the locking plate 182 and the toothed portion mechanism 180 disengaged, the handle 86 is manually lifted and the combined weight of the motor 14 and cutter blade 16 will assist the manual lifting of the handle 86 to pivot the platform 12 downwardly about the first axle 38. The disengagement of the locking plate and toothed portion mechanisms 182 and 180 permits the first and third arms 64 and 66 to pivot about the second axle 58 because the toothed portion mechanism 180 is free to slide axially through the slot 56. With the locking plate and toothed portion mechanisms 182 and 180 disengaged, the platform 12 pivots about the first axle 38. The platform assumes the position shown in FIG. 4 when the lever 174 is released and the tooth 102 cooperates with the locking plate mechanism 182. The locking pin 154 limits the axial movement of the toothed portion mechanism 180 relative the locking plate 182 thereby limiting the depth to which the cutter blade 16 can be lowered.

When the cutter blade 16 is to be adjusted to a higher level than that shown in FIG. 4, the lever 174 is again pulled to release the locking plate and toothed portion mechanisms 182 and 180, respectively. The handle 86 is pivoted about the first axle 38 to lift the platform 12 angularly relative the ground. Because the locking plate and toothed portion mechanisms are disengaged, wheels 76 and 78 pivot downwardly under the influence of gravity and the first portion 92 of the connecting arm 94 will pivot about the distal end of the second arm 84 and the toothed portion mechanism 180 will slide through the slot 56 to assume the position shown in FIG. 5. When the lever 174 is released, the spring 176 will urge the toothed portion mechanism 180 into engagement with the locking plate mechanism 182 to lock the locking plate and toothed portion mechanisms and to lock the depth of the cutter blade 16 relative the ground.

The lawn edger of the present invention provides an extremely rugged mechanism for variably adjusting the depth of the cutting blade relative the ground. The mechanism is controlled from the handle by a lightweight hand control which unlike the prior art devices does not take any of the torsional strain of the depth control mechanism. The hand control merely engages and disengages the toothed portion and locking plate mechanisms which are disposed below the longitudinal plane of the platform. The edger of the present invention does not require a rugged handle and associated components in order to withstand the strain imposed on the depth control lever and the like of prior art devices and because of this, the cost of manufacturing the edger of the present invention is greatly decreased.

The present disclosure includes that contained in that appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A lawn edger having a motor and a cutter blade and a handle mounted hand control for varying the depth of the cutter blade relative the ground, said edger comprising in combination:
   a platform supporting said motor and cutter blade and having a first and a second end, said first and second ends of the platform being disposed in a plane which is angularly disposed relative to the longitudinal plane of the handle;
   first wheel means connected relative to said first end of said platform for supporting said platform a fixed distance from the ground;
   a first arm pivotally connected to said second end of the platform;
   second wheel means for engaging the ground, said second wheel means being rotatable mounted relative said first arm;
   a second arm rigidly connected to said first arm;
   a connecting arm pivotally connected to said second arm;
   a first portion of said connecting arm being disposed adjacent the distal end of said second arm;
   a second portion of said connecting arm angularly connected to said first portion;
   a position retaining means rigidly connected to and extending from the platform for slidably supporting said second portion of said third arm; and
   said second portion and said position retaining means cooperating together for variably adjusting the longitudinal disposition of said second portion relative said position retaining means, said second portion being connected to the hand control for varying the disposition of the platform relative the ground.

2. A lawn edger as set forth in claim 1 wherein said first end of the platform is rigidly secured to the handle.

3. A lawn edger as set forth in claim 2 further including a first axle for rotatably supporting said first wheel means, said first axle being rigidly connected to said first end of the platform.

4. A lawn edger as set forth in claim 3 further including a second axle rotatably connected to said second end of the platform, said second axle being disposed parallel to said first axle.

5. A lawn edger as set forth in claim 4 wherein said first arm is rigidly connected to said second axle, said first arm extending radially relative the longitudinal axis of said second axle such that said first arm pivots relative said second end of the platform.

6. A lawn edger as set forth in claim 1 further including a third axle which is rotatably supported adjacent the distal end of said first arm, said third axle being disposed parallel to said second axle, said third axle being rigidly connected to said second wheel means.

7. A lawn edger as set forth in claim 6 further including a third arm, said third arm being parallel spaced relative said first arm, said third arm being rigidly connected to said second axle, the distal end of the third arm rotatably supporting said third axle such that said first and said third arms are disposed between said second wheel means.

8. A lawn edger as set forth in claim 1 wherein said second arm extends from said first arm adjacent said second end of the platform on the same side of the longitudinal plane of the platform as the handle.

9. A lawn edger as set forth in claim 4 wherein said second arm is rigidly connected to said second axle adjacent said first arm such that said second arm extends from and pivots about the longitudinal axis of said second axle.

10. A lawn edger as set forth in claim 1 wherein said first portion of said connecting arm extends from said distal end of said second arm towards the longitudinal plane of the platform.

11. A lawn edger as set forth in claim 10 wherein said second portion of said connecting arm is disposed on the opposite side of the longitudinal plane of the platform relative the handle.

12. A lawn edger as set forth in claim 11 wherein said second portion extends substantially normal to said second axle.

13. A lawn edger as set forth in claim 1 wherein said position retaining means depends from the first end of the platform, said retaining means defining a slot which slidably receives said second portion of said connecting arm therein.

14. A lawn edger as set forth in claim 13 wherein said second portion includes a plurality of teeth defined by said second portion of said connecting arm, said teeth cooperating with said slot for adjustably securing said second portion relative said retaining means.

15. A lawn edger as set forth in claim 14 wherein the distal end of said second portion defines an aperture, said aperture pivotally receiving therein the distal end of the hand control.

16. A lawn edger as set forth in claim 15 further including a bracket extending from and rigidly secured to the handle adjacent the hand control, said bracket defining a hole through which the hand control extend such that when the hand control is pulled longitudinally relative the handle, the distal end of said second portion is pulled towards said bracket and said second portion is released from engagement with said retaining means to permit pivoting of said first arm relative the platform.

17. A mobile device having a plurality of ground engaging wheels, a load support platform and a hand control for varying the angle defined by the platform and the ground, the device comprising in combination:
   a first end of the platform, said first end being disposed adjacent the hand control;
   a second end of the platform, said second end being disposed remote from the hand control;
   a first arm pivotally connected to said first second of the platform;
   a second arm rigidly connected to said first arm adjacent said second end of the platform, said second arm extending angularly relative said first arm;
   a connecting arm pivotally connected to the distal end of said second arm;

a first portion of said connecting arm, said first portion being disposed adjacent said distal end of said second arm;

a second portion of said connecting arm, said second portion being angularly disposed relative said first portion;

a position retaining means rigidly connected to and extending from said first end of the platform for slidably supporting said second portion of said connecting arm;

a plurality of teeth defined by said second portion, said teeth cooperating with said retaining means, the hand control variably adjusting the longitudinal disposition of said second portion relative said position retaining means; and ground engaging wheel means rotatably disposed relative the distal end of said first arm such that longitudinal movement of said second portion relative said retaining means varies the angle defined by the platform and the ground.

18. A mobile device as set forth in claim 17 further including a motor mounted on the platform; and an edging means supported by the platform, said edging means being driven by said motor for cutting the edge of a lawn.

19. A lawn edger having a plurality of ground engaging wheels, a motor and a cutter blade supporting platform and a handle mounted hand control for varying the depth of the cutter blade relative the ground, said edger comprising in combination:

a first elongated member;

a second elongated member disposed parallel and spaced relative said first member for supporting the platform;

a first and a second end of said first member;

a first and a second end of said second member;

a first axle secured adjacent said first ends of said members;

a first wheel means mounted on said first axle and rotatably relative said first ends of said members;

a second axle rotatably secured adjacent said second ends of said members;

a first arm rigidly connected to said second axle;

a second arm rigidly connected to said second axle and extending radially relative the longitudinal axis of said second axle, said second arm being disposed angularly relative said first arm, said second arm being disposed on the same side of the longitudinal plane of the platform as the handle;

a third arm rigidly connected to said second axle, said third arm being parallel spaced relative said first arm, said first and said third arms extending radially relative the longitudinal axis of said second axle;

a tube rigidly connected to and extending between the distal ends of said first and said third arms;

a third axle extending through said tube;

second wheel means mounted on said third axle and rotatable relative said tube;

a connecting arm pivotally connected to the distal end of said second arm;

a first portion of said connecting arm being disposed adjacent said distal end of said second arm;

a second portion of said third arm, said second portion being angularly disposed relative said first portion, said second portion being disposed on the opposite side of the longitudinal plane of the platform from the handle;

a depending plate disposed adjacent said first axle;

a slot defined by said plate, said slot slidably receiving therethrough said second portion of said third arm; and a plurality of teeth defined by said second portion, said teeth cooperating with said slot to adjustably vary the longitudinal disposition of said second portion relative said plate, the distal end of the hand control pivotally cooperating with the distal end of said second portion to manually release said teeth from said slot to vary the depth of the cutter blade relative the ground.

* * * * *